United States Patent [19]

Bar

[11] 4,423,164
[45] Dec. 27, 1983

[54] POLYMERIC FILMS FOR USE IN AGRICULTURE

[76] Inventor: Rami Bar, Kibbutz Ginegar, Israel

[21] Appl. No.: 340,248

[22] Filed: Jan. 18, 1982

[30] Foreign Application Priority Data

Feb. 4, 1981 [IL] Israel ......................................... 62066

[51] Int. Cl.³ ............................ C08K 3/26; C08K 3/20
[52] U.S. Cl. ......................................... 523/135; 47/17;
47/29; 524/425; 524/427; 524/433
[58] Field of Search ....................... 524/425, 427, 433;
523/135; 47/17, 29; 428/220

[56] References Cited

U.S. PATENT DOCUMENTS

| | | | |
|---|---|---|---|
| 2,466,038 | 4/1949 | Lewis et al. | 524/427 |
| 3,326,739 | 6/1967 | Brennan et al. | 524/425 |
| 3,821,156 | 6/1974 | Farrar | 524/425 |
| 3,857,804 | 12/1974 | Glatti et al. | 428/220 |
| 3,884,870 | 5/1975 | Dodson et al. | 524/425 |
| 4,048,208 | 9/1977 | Spicuzza et al. | 524/433 |
| 4,075,784 | 2/1978 | Pied | 524/427 |
| 4,134,875 | 1/1979 | Tapia | 423/518 |
| 4,179,547 | 12/1979 | Allingham | 524/417 |
| 4,265,960 | 5/1981 | Arbit et al. | 524/427 |

FOREIGN PATENT DOCUMENTS

| | | | |
|---|---|---|---|
| 712639 | 6/1965 | Canada | 524/433 |
| 1574088 | 7/1969 | France . | |
| 55-164238 | 12/1980 | Japan | 523/135 |

*Primary Examiner*—Lewis T. Jacobs
*Attorney, Agent, or Firm*—Browdy and Neimark

[57] ABSTRACT

There are provided polymeric compositions in sheet or film form adapted to transmit a large part of incident sunlight, a substantial part thereof by forward scattering, and to retain in an agricultural structure such as a greenhouse or tunnel-structure covered with such sheets a substantial part of IR radiation. The compositions comprise a polymer containing micron size particles of magnesium oxide and/or calcium carbonate.

7 Claims, 3 Drawing Figures

POLYMERIC FILMS FOR USE IN AGRICULTURE

FIELD OF THE INVENTION

The present invention relates to novel polymeric compositions for use in agriculture, and especially for use in structures such as greenhouses and tunnel-shaped structures of the type used for the cultivation of plants. The novel compositions are used in sheet or film form, and these transmit the larger part of incident light into the interior of such structures, while IR radiation from the inside is reflected by such sheets back into the structures. The novel polymeric sheets result in the forward scattering of incident sunlight, and about 85% of the energy enters the structures; about 70% of this undergoes forward scattering resulting in diffuse light retaining more of the radiation in the structure. When these sheets and films are used for greenhouse and walk-in tunnels, the whole growing plant benefits from the diffused light and the whole plant partakes in photosynthesis. There is no difference in plant growth relating to its position in the greenhouse as there is practically no shadow on the side away from the sun. (ref. Plant Physiology, A Treatise; Part VA 29.9-406).

As part of the incident light is reflected back, in hot climates and in temperate zones during mid-summer the temperatures at the interior of structures covered with such sheets will be lower than those covered with conventional polyethylene sheets. In spite of this, enough solar energy is allowed into such structures so as to supply the needs of the growing plants and to heat up the soil in the interior. At night the soil radiates the heat energy in the form of IR radiation, and a larger part of this is reflected back by such sheets and thus retained in the structures.

The overall effect is that such novel greenhouses will have a regulated temperature during day and night with smaller temperature differences, and the visible solar radiation is utilized for the optimum effect on growing plants while in greenhouses which are heated in the interior, heat losses to the outside are drastically reduced, resulting in a substantial saving of energy (of about 20%).

"The Effect of Light Diffusion Properties of Greenhouse Covers", A. Nissen et P. Basiaux, Agric. Meterology 11 (1973) 357-372 summarize the important parameters.

STATE OF THE PRIOR ART

In French Pat. No. 1574088, U.S. Pat. No. 4,179,547 and U.S. Pat. No. 4,134,875, there are described compositions which absorb part of the infrared radiation.

When the absorbing film re-emits the radiation, a part of it re-enters the greenhouse. Although the temperature in greenhouses with abovementioned compositions is higher than the temperature with regular polyethylene, healthier plants and heavy crops can be expected if sunlight would be more readily available to plants grown under these sheets.

There is nearly no diffuse light in greenhouses covered by a silica-silicate filled sheet (French Pat. No. 1574088). Much improved crops are obtained when grown under phosphate filled sheets of U.S. Pat. No. 4,179,547 where 46% of transmitted light is diffused and in structures covered with sheeting according to U.S. Pat. No. 4,134,875 which relates to polyolefin sheets having an alunite-aluminum hydroxide filler and which alleges a 40% diffusion of transmitted light.

SUMMARY OF THE INVENTION

The present invention relates to novel compositions of matter comprising polymers which are generally transparent, and which contain predetermined quantities of additives adapted to change their optical and other properties. According to the present invention predetermined quantities of fine particle size magnesium oxide and/or of calcium carbonate are added. Optionally there are also added UV absorbers, or antifog agents which prevent the formation of droplets on the surface of the sheets and which result in the spreading out of such droplets on the surface of the sheet.

DETAILED DESCRIPTION OF THE PRESENT INVENTION

Figure 1:
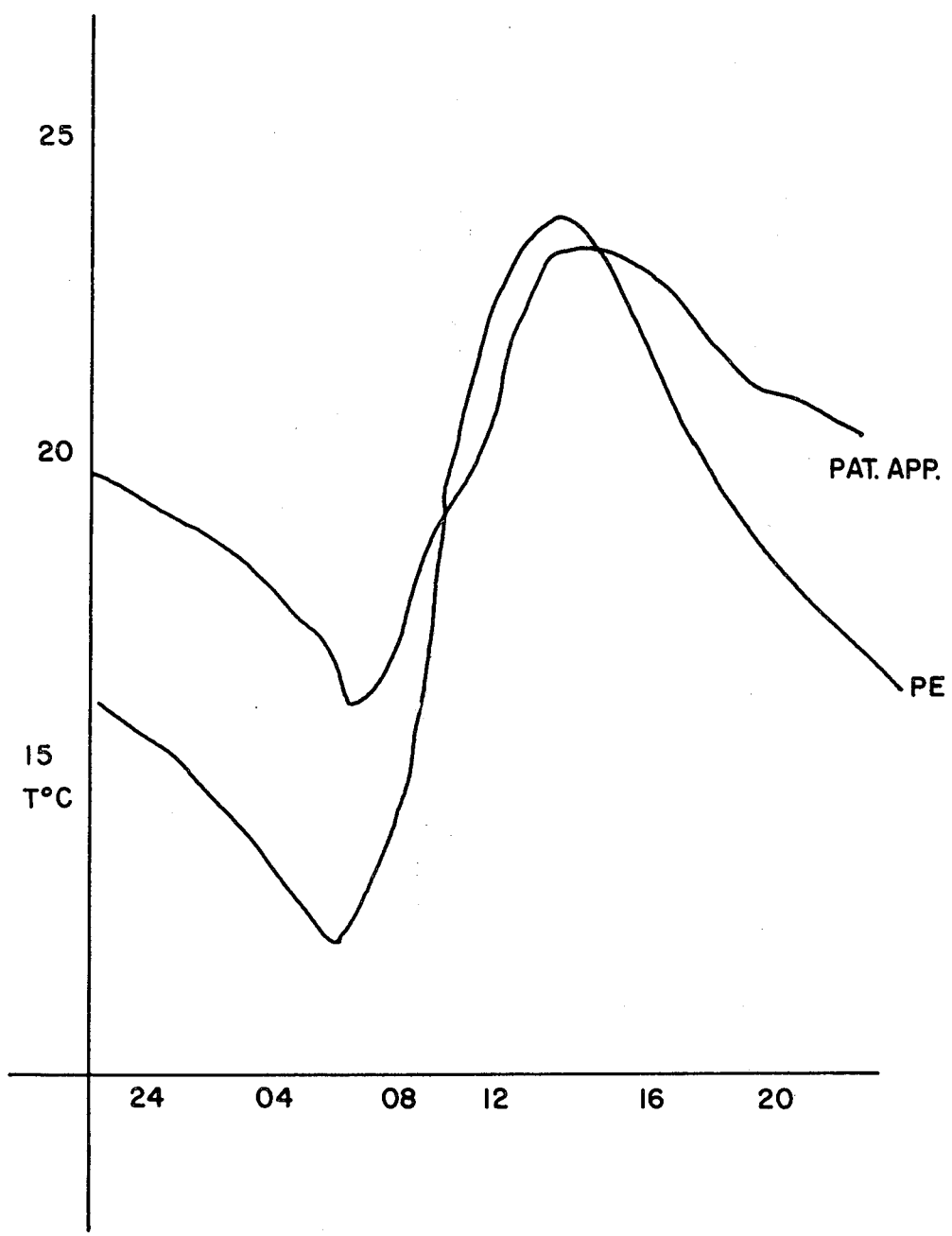
FIG. 1 is a graph illustrating the change of temperature within a greenhouse enclosed by the present invention as compared with the temperature changes in a greenhouse constructed with polyethylene.

For the polymeric portion of the present invention, there may be used polyolefins, and preferably polyethylenes, copolymers of same, polyesters, polyvinyl chloride, and the like. Amongst these there may be mentioned ethylene-vinylacetate copolymers, polycarbonates and polyester foils.

The magnesium oxide and/or the calcium carbonate are used in the form of particles of less than $5\mu$ (five microns) and preferably less than $5\mu$, although somewhat larger particles can be used. The quantity of the added magnesium oxide (MgO) and/or the added calcium carbonate ($CaCO_3$) is of the order of from about 1 to 12 percent by weight, the optimum being about 4 to 6% by weight. In darkness MgO reflects back at about a wavelength of 12 to $15\mu$, while calcium carbonate reflects mainly at about $6\mu$ to about $10\mu$. The practical amounts of these may be from only magnesium oxide to only calcium carbonate, but the preferred amounts are 1-12% magnesium oxide and 0-8% calcium carbonate, the most preferred ratios being from 2:1 to 1:2 by weight.

In hotter climates a preponderance of magnesium oxide is used. The addition of calcium carbonate and/or of magnesium oxide improves the mechanical properties of the sheets. It is advisable to include in the novel sheets also additives such as UV absorbers and antioxidants. These may be of the benzophenone type and of the hindered phenol type. It is advisable to add materials such as antifog agents which result in a spread-out of droplets on the sheets. Suitable anti-fog agents are substances such as glycerol stearate or the like. The thickness of the sheets is generally of the order of about 0.05 mm to about 0.25 mm. The resulting materials are translucent, and have a pronounced forward scattering of light.

The novel sheets make possible the construction of improved greenhouses and tunnel-shaped structures of the type used for the cultivation of plants, producing a desired microclimate which provides optimum conditions for the growing plants. It is thus possible to produce earlier and heavier crops than in the open field. Earlier crops means considerably increased income, and this applies of course also to heavier crops. The quicker growth and earlier ripening of fruit, vegetables and flowers make possible to export some and to obtain higher prices. Even a time span of one or two weeks is of critical importance in this respect. The novel structures make possible an optimum control of temperature, light intensity and nature of light (diffuse light), moisture and the like. Transparent polymer sheets are preferred to glass, as they do not require heavy supporting structures and as they are rapidly and easily replaced. Glass requires an annual summer "whitening" ($CaCO_3$ suspension) to prevent scorching of part of the plants facing the sun. This is due to the fact that glass is transparent to but not diffusing to light, and by applying the diffusing particles of calcium carbonate on the glass, damage to plants is prevented. Transparent plastic sheets also require summer "whitening".

Polyethylene sheeting is pervious to IR radiation, hence substantial heat loss occurs at night under such covers. Another drawback of polyethylene is that it does not diffuse the light and like glass requires whitening. The same applies to polycarbonate, polyvinyl chloride and polyester covers.

Figure 2:
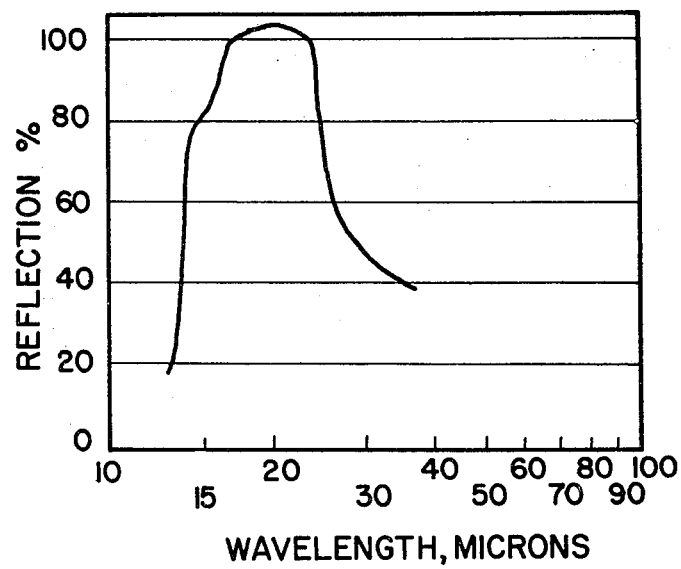
FIG. 2 is a graph demonstrating the reflection of magnesium oxide depending on the wavelength.
Figure 3:
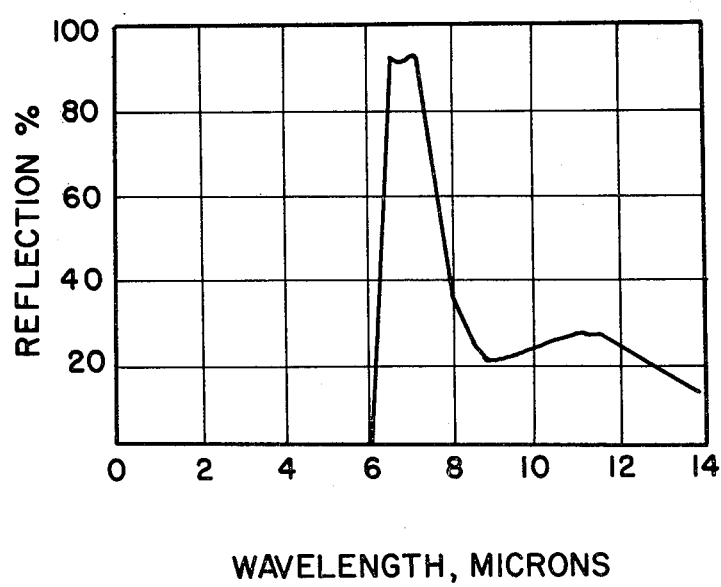
FIG. 3 is a graph depicting the reflection of calcium carbonate depending on the wavelength.

The IR reflection of MgO and $CaCO_3$ are set out in the American Institute of Physics Handbook, 2nd Ed., 6-19 and 6-130 and are illustrated in FIGS. 2 and 3. The soil in the greenhouse constitutes the heat reservoir. During daytime solar energy coming in as sunlight heats the soil. When the proportion of diffuse light is higher the heating of the soil is increased. At night the soil radiates, especially in the range of between $5\mu$ and $30\mu$, and this radiation maintains an interior temperature of the greenhouse which is higher than that of the environment. The novel polymer sheets according to the invention make it possible to obtain substantial temperature difference between the inside and the outside of the greenhouses, of the order of up to 3° C. in the soil. It ought to be stressed that even a difference of 0.5° C. of the air is significant and beneficial.

Phosphate filled polyethylene was tested, and also the combination of alunite and aluminum hydroxide. These provide for a transmittance of about 80% of the incident light, and about 45% of this is in diffuse form. The novel compositions of the present invention transmit about 85% of the incident light and about 70% of this is diffuse light. These values were obtained at about 0.15 mm thickness of the sheets. Gypsophila flowers gave 50% more by weight of crop compared to polyethylene sheeting.

With cucumbers earlier crops and an increase of crop by about 30 to 40% was attained. Grapes ripened about a fortnight earlier and could be exported at much higher prices. When, during wintertime, heating of the greenhouses is resorted to, the IR reflection of the novel sheeting results in a highly significant energy saving of the order of about 20 to 25 percent compared with polyethylene sheeting and in a higher soil temperature.

With regular polyethylene sheets, during bright nights the internal temperature of the greenhouse is generally lower than the outside temperature, and especially during the very early morning hours. This is not so with the novel compositions of the present invention, and a higher internal temperature is maintained due to the reflection of the IR radiation at the inside by the novel sheeting. FIG. 1 illustrates the changes of temperature, with compositions of 1:1 MgO and $CaCO_3$, total of 4% by weight, the X-axis giving hours of a 24-hour cycle and the Y-axis soil temperature (°C.) at 10 cm depth.

EXAMPLE

A quantity of 50 kg magnesium oxide, $-3\mu$ mesh size was mixed with 50 kg of low density (d=0.92) polyethylene in a Banbury mixer at 180° C.; the mixture was extruded and pelleted.

A quantity of 50 kg calcium carbonate, $-3\mu$ mesh size was mixed with 50 kg low density (d=0.92) polyethylene in a Banbury mixer at 180° C., extruded and pelleted.

The above were mixed in a desired quantity and ratio with polyethylene in an extruder and blown into films or sheets of 0.03 to 0.2 mm thickness. The preferred thickness is between 0.1 and 0.15 mm. The resulting sheets were used for the construction of greenhouses and for the construction of walk-in tunnels of conventional dimensions. The results are summarized in the following Table I.

TABLE I

Properties of Blown Films and Sheets Based on Low Density (0.92/cc) Polyethylene With Various Fillers. All Samples 0.1 mm Thick.

| Filler | | | Tensile Strength | | | | Tear Resistance | | | Trans- | |
| Calcium Carbonate % | Magnesium Oxide % | Total % | ASTM M* | D882 T | Elongation M | T | ASTM M | D1922 T | Impact Strength ASTM D1709 | mission ASTM | Haze % D1003 |
| --- | --- | --- | --- | --- | --- | --- | --- | --- | --- | --- | --- |
| 0 | 0 | 0 | 167.3 | 140.1 | 415 | 452 | 270 | 412 | 415 | 90.0 | 14.0 |
| 4 | 0 | 4 | 166.7 | 139.6 | 399 | 477 | 229 | 478 | 410 | 87.1 | 70.1 |
| 7.5 | 0 | 7.5 | 163.4 | 140.0 | 357 | 430 | 247 | 494 | 440 | 83.0 | 75.1 |
| 3 | 3 | 6 | 170.2 | 161.3 | 402 | 472 | 241 | 479 | 410 | 86.5 | 72.0 |
| 0 | 4 | 4 | 173.7 | 170.8 | 413 | 471 | 232 | 468 | 410 | 85.8 | 76.0 |
| 0 | 10 | 10 | 179.3 | 179.2 | 404 | 508 | 222 | 451 | 420 | 82.8 | 73.8 |
| French Pat. No. 1574088 # | | | | | | | | | | 60 | 25 |
| U.S. Pat. No. 4.134,875 # | | | | | | | | | | 80 | 46 |
| U.S. Pat. No. 4179547 # | | 5 | 159.8 | 144.9 | 355 | 473 | 247 | 473 | 350 | 87 | 45 |

*M = machine direction
T+ = transverse to machine direction
Thickness of commercial sample: 0.2 mm
+Γ = Transmittance of light expressed as percentage of incident light
Haze = Percent of light transmitted other than in the direction of incident light.

TABLE 2 summarizes the results of the cultivation of Gypsophila flowers grown in winter 1980/81 and in spring 1980 in tunnels covered with three types of sheets according to the present invention, compared with conventional polyethylene sheets. It is evident that a very heavy earlier crop was obtained, and this is highly significant from an economical point of view.

TABLE 2

| 1980/81 | Weight of Gypsophila (in kg) | | | |
|---|---|---|---|---|
| | PE | PE + 4% MgO | PE + 4% CaCO₃ | PE + 2% MgO + 2% CaCO₃ |
| Winter 24/12 to 4/2 | 9.85 | 49.05 | 18.81 | 23.30 |
| Spring 23.4–2/5 | 78.00 | 94.45 | 90.25 | 92.15 |
| TOTAL: | 87.85 | 143.55 | 109.05 | 115.45 |

The earlier very heavy crop is of great significance to the grower.

TABLE 3 summarizes fuel consumption during two nights in three structures covered with sheets according to the present invention compared with a structure covered with conventional polyethylene sheeting. The four structures were heated with identical heaters and maintained at between 12° and 13° C. The fuel consumption is in kg fuel.

TABLE 3

| | Fuel Consumption in Kg | | | |
|---|---|---|---|---|
| Minimum outside Temperarure | PE | PE + 4% MgO | PE + 4% CaCO₃ | PE + 2% MgO + 2% CaCO₃ |
| 6.5° C. | 6.621 | 4.268 | 5.006 | 4.515 |
| 7.2° C. | 6.607 | 4.011 | 4.547 | 4.238 |

TABLE 4 summarizes the light intensity in structures covered with different types of polyethylene sheets. The intensity was measured three times per day during two days. Direct light T and diffuse light D are shown as percentage of outside light which is taken as 100%. The values higher than 100% do not reflect on the total light energy.

TABLE 4

| | | Light Intensities | | | | |
|---|---|---|---|---|---|---|
| | | PE | | PE + 4% CaCO₃ | | PE + 4% MgO₃ |
| Time | | T | D | T | D | T | D |
| Day 1 | 7:15 a.m. | 87 | 108 | 86 | 129 | 80 | 147 |
| | 11:00 a.m. | 89 | 152 | 94 | 154 | 86 | 248 |
| | 14:30 p.m. | 75 | 134 | 68 | 133 | 65 | 181 |
| Day 2 | 7:15 a.m. | 76 | 146 | 75 | 142 | 76 | 185 |
| | 11:00 a.m. | 80 | 230 | 89 | 235 | 80 | 264 |
| | 14:30 p.m. | 55 | 171 | 64 | 168 | 60 | 177 |

I claim:

1. A polymeric composition in film or sheet form, adapted to transmit a large part of incident sunlight, a substantial part thereof by forward scattering, and to reflect a large part of incident IR radiation, consisting essentially of:
   a polymer or copolymer, which is generally transparent; and
   micron size particles of an additive comprising 1–12% magnesium oxide and 0–8% calcium carbonate, the total combined additive being in the range of 1 to 12%, all percentages being by weight of the polymeric composition.

2. A polymeric composition in accordance with claim 1, wherein said film or sheet is in a thickness of 0.05 mm to 0.25 mm.

3. A polymeric composition in accordance with claim 1, wherein said additive consists essentially of magnesium oxide to the exclusion of calcium carbonate.

4. A polymeric composition in accordance with claim 1, wherein the ratio of MgO to CaCO₃ is in the range of 1:2 to 2:1.

5. A polymeric composition in accordance with claim 1, wherein the additive is in the form of $-5\mu$ size particles.

6. A polymeric composition in accordance with claim 1, further including an antioxidant, an anti-fog agent, and/or a UV absorber.

7. A polymeric composition in accordance with claim 1, wherein said polymer or copolymer is a polyolefin.

* * * * *